United States Patent [19]

Lathers et al.

[11] Patent Number: 4,934,303
[45] Date of Patent: Jun. 19, 1990

[54] CONVERTIBLE BOLSTER/SEAT FOR RECREATIONAL BOATS

[75] Inventors: Michael W. Lathers, Metamora; David R. Hudson, Cadillac, both of Mich.

[73] Assignee: Outboard Marine Corporation, Waukegan, Ill.

[21] Appl. No.: 216,808

[22] Filed: Jul. 8, 1988

[51] Int. Cl.⁵ .............................................. B63B 17/00
[52] U.S. Cl. ...................................... 114/363; 297/313
[58] Field of Search ...................... 114/188, 189, 363; 297/14, 313, 337, 345, 331, 334, 335, 338, 297; 5/3-7, 29, 49, 50, 118

[56] References Cited

U.S. PATENT DOCUMENTS

| | | | |
|---|---|---|---|
| 920,500 | 5/1909 | Thomas | 297/337 |
| 3,376,587 | 4/1968 | Staron | 297/331 |
| 3,762,764 | 10/1973 | McJunkin | 297/331 |
| 3,851,917 | 12/1974 | Horstmann et al. | 297/345 |

Primary Examiner—Sherman D. Basinger
Assistant Examiner—Thomas J. Brahan
Attorney, Agent, or Firm—Michael, Best & Friedrich

[57] ABSTRACT

A marine vehicle comprising a hull, a deck supported by the hull, and a seat apparatus mounted on the deck and including a generally vertical seat back member, a seat bottom member moveable relative to the seat back member between a horizontal position wherein the seat bottom member extends generally horizontally, and a vertical position wherein the seat bottom member extends generally vertically and downwardly from the seat back member, and a mechanism for moving the seat back member generally vertically between a lower position and an upper position.

17 Claims, 2 Drawing Sheets

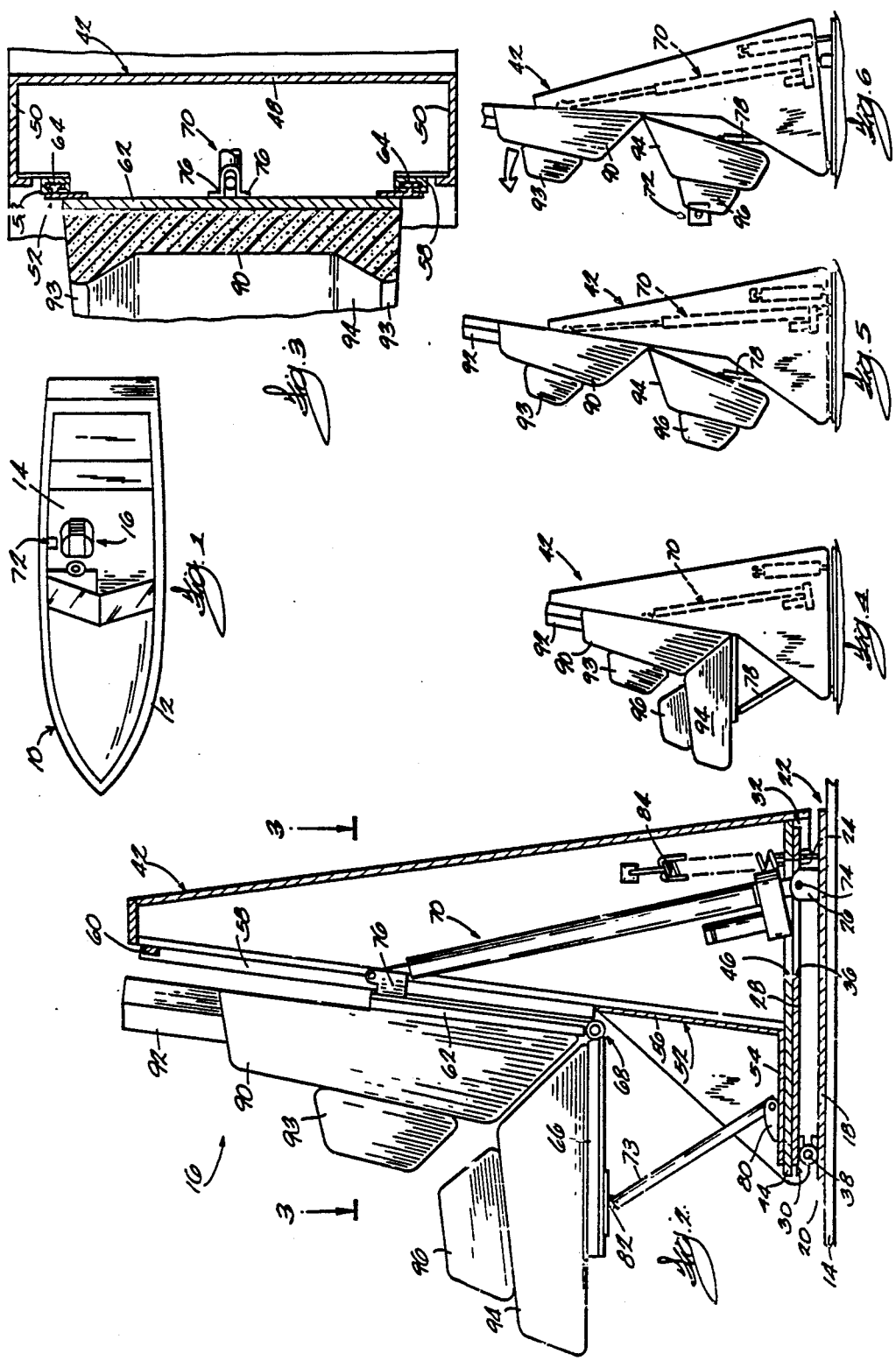

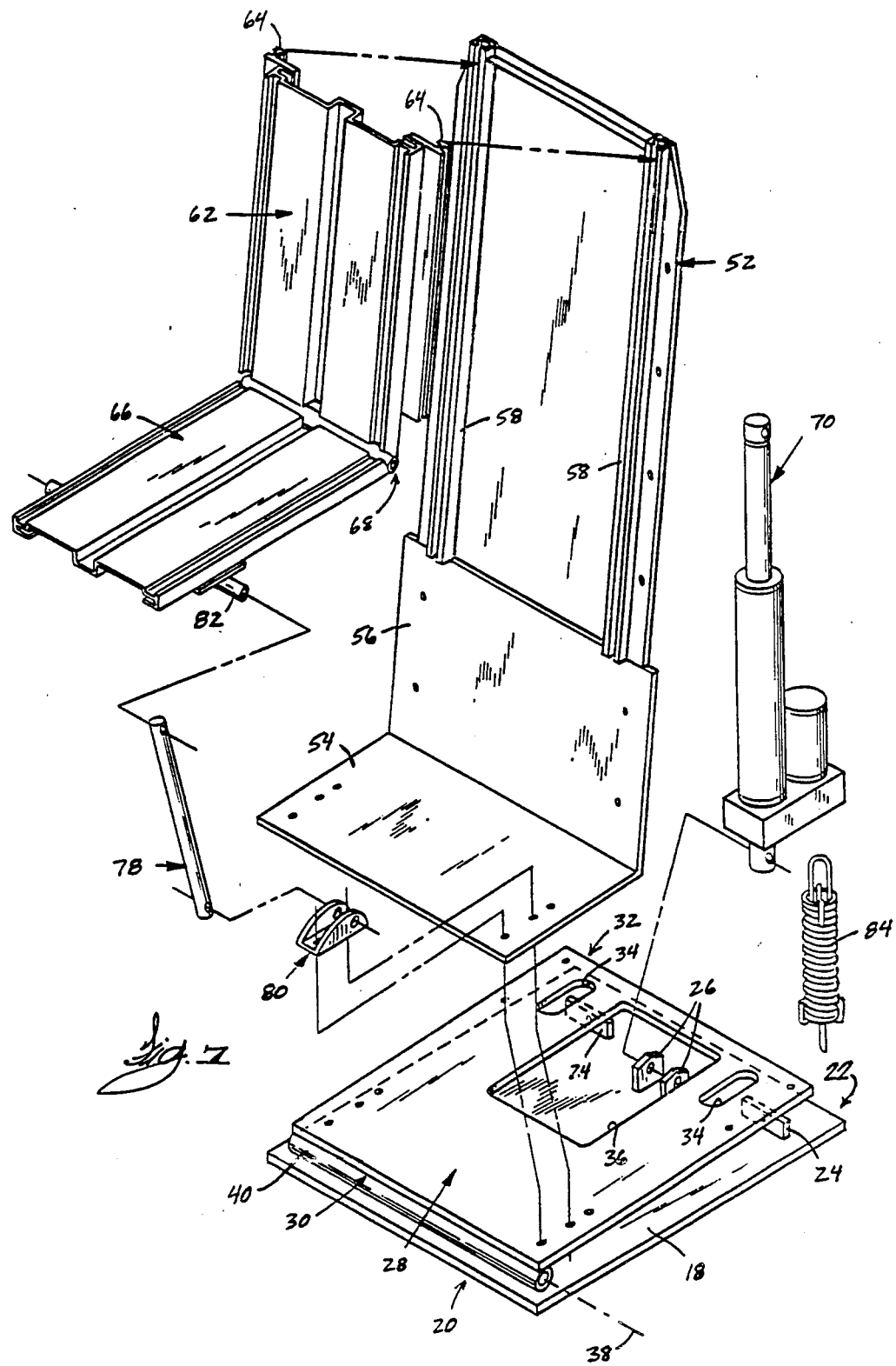

CONVERTIBLE BOLSTER/SEAT FOR RECREATIONAL BOATS

BACKGROUND OF THE INVENTION

The invention relates to recreational boats and to racing boats. More particularly, the invention relates to seats and bolsters for such boats.

It is known to provide racing boats with bolsters, instead of conventional seats, for the driver and at least some of the crew. A bolster supports the back of the user while the user stands on the deck, rather than sitting on a seat, so that the user's legs absorb shocks. A bolster does not permit the user to sit down.

On the other hand, recreational boats typically include conventional seats for the driver and crew.

SUMMARY OF THE INVENTION

The invention provides a marine vehicle comprising a hull, a deck supported by the hull, and a seat apparatus mounted on the deck and including a generally vertical seat back member, a seat bottom member moveable relative to the seat back member between a horizontal position wherein the seat bottom member extends generally horizontally, and a vertical position wherein the seat bottom member extends generally vertically and downwardly from the seat back member, and means for moving the seat back member generally vertically between a lower position and an upper position.

The invention also provides a marine vehicle comprising a hull, a deck supported by the hull, and seat apparatus including a base mounted on the deck, an upright member connected to the base, a seat back member having a lower end and being connected to the upright member for generally vertical movement relative thereto between a lower position and an upper position, a selectively extendable and contractable link having a first end pivotally connected to the base and a second end pivotally connected to the seat back member, and a seat bottom member having a rearward end connected to the lower end of the seat back member for pivotal movement relative thereto about a generally horizontal axis and between a generally horizontal position and a generally vertical position.

The invention also provides a seat apparatus comprising a base, a generally horizontal plate having a rearward end, and a forward end connected to the base for pivotal movement relative thereto about a generally horizontal axis and such that the rearward end is movable relative to the base between a tilted-down position and a tilted-up position, an upright member fixed to the plate, a seat back member having a lower end and being connected to the upright member for generally vertical movement relative thereto between a lower position and an upper position, means for limiting for upward movement of the seat back member relative to the upright member beyond the upper position, a selectively extendable and contractable link having a first end pivotally connected to the base and a second end pivotally connected to the seat back member, means for biasing the plate to the tilted-down position, the biasing means including a spring extending between the base and the upright member, a seat bottom member having a rearward end connected to the lower end of the seat back member for pivotal movement relative thereto about a generally horizontal axis and between a generally horizontal position and a generally vertical position, and means for moving the seat bottom member to the horizontal position in response to movement of the seat back member to the lower position and for moving the seat bottom to the vertical position in response to movement of the seat back member to the upper position.

A principal feature of the invention is the provision of a seat apparatus that is convertible between a conventional seat and a bolster. For this purpose, the apparatus includes a seat back member, a seat bottom member movable between a horizontal position and a vertical position, and means for moving the seat back member generally vertically between a lower position and an upper position.

Other features and advantages of the invention will become apparent to those skilled in the art upon review of the following detailed description, claims and drawings.

DESCRIPTION OF THE DRAWINGS

FIG. 1 is a plan view of a recreational boat embodying the invention and including a seat apparatus.

FIG. 2 is a side elevational view, partially in section, of the seat apparatus.

FIG. 3 is a view taken along line 3—3 in FIG. 2.

FIG. 4 is an elevational view of the seat apparatus arranged as a seat.

FIGS. 5 and 6 are views similar to FIG. 4 and showing the seat apparatus arranged as a bolster.

FIG. 7 is an exploded view of various elements of the seat apparatus.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A marine vehicle or recreational boat 10 embodying the invention is illustrated in FIG. 1. The boat 10 comprises a hull 12, a deck 14 supported by the hull 12, and a seat apparatus 16 mounted on the deck 14.

As shown in FIGS. 2, 3 and 7, the seat apparatus 16 includes a base plate 18 mounted on the deck 14. The base plate 18 includes forward and rearward or left and right ends 20 and 22, respectively. The base plate 18 has thereon a pair of projections 24, and a pair of projections 26, the reasons for which are explained hereinafter.

The apparatus 16 also includes a generally horizontal upper plate 28 having forward and rearward or left and right ends 30 and 32, respectively. The upper plate 28 has therein a pair of apertures 34, and an aperture 36, the reasons for which are explained hereinafter. The apertures 34 are aligned with the projections 24 on the base plate 18, and the aperture 36 is aligned with the projections 26 on the base plate 18. The forward end of the upper plate 28 is connected to the forward end of the base plate 18 for pivotal movement relative thereto about a generally horizontal axis 38 and such that the rearward end of the upper plate 28 is movable relative to the base plate 18 between a tilted-down position (FIGS. 2, 4 and 5) and a tilted-up position (FIG. 6). In the preferred embodiment, the upper plate 28 is connected to the base plate 18 by a conventional hinge apparatus 40 (FIG. 7).

The apparatus 16 also includes (see FIGS. 2 and 3) a seat frame 42 fixedly mounted on the upper plate 28. The seat frame 42 includes a horizontal portion 44 mounted on the upper surface of the upper plate 28 and having therein apertures aligned with the apertures 34 and 36 in the upper plate. An aperture 46 aligned with the aperture 36 is shown in FIG. 2. The seat frame 42 also includes a generally vertical rear panel 48, and side panels 50.

The apparatus 16 also includes an upright member 52 fixedly connected to the upper plate 28. More particularly, the upright member 52 is mounted on top of the horizontal portion 44 of the seat frame 42. The upright member 52 is generally L-shaped and includes a generally horizontal plate 54 fixedly connected to the horizontal portion 44 of the seat frame 42, and a generally vertical plate 56 extending upwardly from the rearward end of the horizontal plate 54. The upright member 52 also includes a pair of spaced apart, generally parallel, channel-shaped members 58 extending upwardly from the vertical plate 56. The upper ends of the channel-shaped members 58 are connected by a brace member 60.

The apparatus 16 also includes a generally vertical seat back member 62 having upper and lower ends. The seat back member 62 is connected to the upright member 52 for generally vertical movement relative thereto between a lower position (FIG. 2) and an upper position (FIGS. 5 and 6). While the seat back member 62 can be connected to the upright member 52 by any suitable means, in the preferred embodiment, the seat back member 62 has thereon a pair of T-shaped projections 64 each slideably housed by a respective channel-shaped member 58.

The apparatus 16 also includes a seat bottom member 66 having forward and rearward ends. The rearward end of the seat bottom member 66 is connected to the lower end of the seat back member 62 for pivotal movement relative thereto between a horizontal position (FIGS. 2 and 4) wherein the seat bottom member 66 extends generally horizontally, and a vertical position (FIGS. 5 and 6) wherein the seat bottom member 66 extends generally vertically and downwardly from the lower end of the seat back member 62. In the illustrated construction, the seat bottom member 66 is connected to the seat back member 62 by a conventional hinge apparatus 68.

The apparatus 16 also includes means for moving the seat back member 62 generally vertically between the lower and upper positions. While various suitable means can be employed, in the preferred embodiment, such means includes a selectively extendable and contractable link 70 having a first or lower end pivotally connected to the base plate 18 and a second or upper end pivotally connected to the seat back member 62. Preferably, the link 70 is an electrically actuated screw jack. A switch 72 (FIGS. 1 and 6) mounted on the boat 10 adjacent the apparatus 16 controls the screw jack 70. The screw jack 70 extends through the aperture 36 in the upper plate 28 and the lower end of the screw jack 70 is pivotally connected to the projections 26 on the base plate 18 by a pin 74. The upper end of the screw jack 70 is pivotally connected to a pair of projections 76 extending rearwardly from the seat back member 62.

The apparatus 16 also includes means for moving the seat bottom member 66 to the horizontal position in response to movement of the seat back member 62 to the lower position and for moving the seat bottom member 66 to the vertical position in response to movement of the seat back member 62 to the upper position. While various suitable moving means can be employed, in the preferred embodiment, such means includes a pair of seat legs 78 (only one is shown) each having an upper end pivotally connected to the seat bottom member 66 and a lower end pivotally connected to the horizontal plate 54 of the upright member 52 (and thus to the upper plate 28). More particularly, the horizontal plate 54 of the upright member 52 has thereon a pair of clevises 80, the seat bottom member 66 has thereon a tube 82, the lower end of each of the seat legs 78 is pivotally connected to a respective clevis 80 and the upper end of each of the seat legs 78 is pivotally connected to a respective end of the tube 82.

The apparatus 16 also includes means for limiting upward movement of the seat back member 62 relative to the upright member 52 beyond the upper position. While various suitable limiting means can be used, in the illustrated construction, such means includes the seat legs 78.

The apparatus 16 further includes means for biasing the upper plate 28 to the tilted-down position. While various suitable biasing means can be used, in the illustrated construction, such means includes a pair of springs 84 (only one is shown) extending between the base plate 18 and the seat frame 42 (and thus between the base plate 18 and the upright member 52). Each spring 84 extends through one of the apertures 34 in the upper plate 28, and each spring 84 has an upper end connected to the seat frame 42 and a lower end connected to one of the projections 24.

The apparatus 16 further includes means for tilting the upper end of the seat back member 62 forwardly when the seat back member 62 is in the upper position. While various suitable tilting means can be employed, in the preferred embodiment, such means includes the screw jack 70. Because the upright member 52 and the base plate 18 are biased toward the tilted-down position by the springs 84, extension of the screw jack 70 initially causes upward movement of the seat back member 62 relative to the upright member 52. However, after the seat back member 62 has reached the upper position, so that further upward movement of the seat back member 62 relative to the upright member 52 is prevented, further extension of the screw jack 70 causes pivotal movement of the upper plate 28 about the axis 38 and thus tilting of the upright member 52 and the upper plate 28 from the tilted-down position toward the tilted-up position. This is illustrated in FIG. 6.

The apparatus 16 also includes means for limiting tilting of the seat back member 62. While various suitable means can be used, in the preferred embodiment, such means includes the location of the switch 72. More particularly, the switch 72 is located adjacent the seat apparatus 16 such that access to the switch 72 is prevented if the seat back member 62 is tilted too far forward.

The apparatus 16 also includes a seat back cushion 90 mounted on the seat back member 62 and having thereon a headrest 92 and a pair of lateral chest supports 93 on opposite sides of the seat back cushion 90 (see FIG. 3), and a seat bottom cushion 94 mounted on the seat bottom member 66 and having thereon a pair of support members 96 (only one is shown) on opposite sides of the seat bottom cushion 94. The support members 96 serve as arm rests when the seat bottom member 66 is in the horizontal position and serve as lateral knee supports when the seat bottom member 66 is in the vertical position.

Various features of the invention are set forth in the following claims.

We claim:

1. A marine vehicle comprising a hull, a deck supported by said hull, and a seat apparatus mounted on said deck and including a generally vertical seat back member, a seat bottom member moveable relative to said seat back member between a horizontal position wherein said seat bottom member extends generally horizontally, and a vertical position wherein said seat bottom member extends generally vertically and downwardly from said seat back member, and means for sliding said seat back member in a generally vertical path between a lower position and an upper position.

2. A marine vehicle as set forth in claim 1 wherein said seat apparatus further includes means for moving said seat bottom member to said horizontal position in response to movement of said seat back member to said lower position and for moving said seat bottom member to said vertical position in response to movement of said seat back member to said upper position.

3. A marine vehicle as set forth in claim 1 wherein said seat back member has an upper end, and wherein said apparatus also includes means for tilting said upper end of said seat back member forwardly when said seat back member is in said upper position.

4. A marine vehicle comprising a hull, a deck supported by said hull, and a seat apparatus including a base mounted on said deck, an upright member connected to said base, a seat back member having a lower end and being connected to upright member for generally vertical sliding movement relative thereto between a lower position and an upper position, a selectively extendable and contractable link having a first end connected to said base and a second end connected to said seat back member, and a seat bottom member having a rearward end connected to said lower end of said seat back member for pivotal movement relative thereto about a generally horizontal axis and between a generally horizontal position and a generally vertical position.

5. A marine vehicle as set forth in claim 4 wherein said seat apparatus also includes means for limiting upward movement of said seat back member relative to said upright member beyond said upper position.

6. A marine vehicle comprising a hull, a deck supported by said hull, and a seat apparatus including a base mounted on said deck, a generally horizontal plate having a rearward end, and a forward end connected to said base for pivotal movement relative thereto about a generally horizontal axis and such that said rearward end is movable relative to said base between a tilted-down position and a tilted-up position, an upright member connected to said plate, a seat back member having a lower end and being connected to said upright member for generally vertical movement relative thereto between a lower position and an upper position, a selectively extendable and contractible link having a first end connected to said base and a second end connected to said seat back member, and a seat bottom member having a rearward end connected to said lower end of said seat back member for pivotal movement relative thereto about a generally horizontal axis and between a generally horizontal position and a generally vertical position.

7. A marine vehicle as set forth in claim 6 wherein said seat apparatus also includes means for biasing said plate to said tilted-down position, said biasing means including a spring extending between said base and said upright member.

8. A marine vehicle comprising a hull, a deck supported by said hull, and a seat apparatus including a base mounted on said deck, an upright member connected to said base, a seat back member having a lower end and being connected to said upright member for generally vertical movement relative thereto between a lower position and an upper position, a selectively extendable and contractible link having a first end connected to said base and a second end connected to said seat back member, a seat bottom member having a rearward end connected to said lower end of said seat back member for pivotal movement relative thereto about a generally horizontal axis and between a generally horizontal position and a generally vertical position, and means for moving said seat bottom member to said horizontal position in response to movement of said seat back member to said lower position and for moving said seat bottom to said vertical position in response to movement of said seat back member to said upper position.

9. A marine vehicle as set forth in claim 8 wherein said seat apparatus also includes a generally horizontal plate having a rearward end, and a forward end connected to said base for pivotal movement relative thereto about a generally horizontal axis and such that said rearward end is movable relative to said base between a tilted-down position and a tilted-up position, wherein said upright member is fixed to said plate, and wherein said means for moving said seat bottom member includes a member having a first end pivotally connected to said plate and a second end pivotally connected to said seat bottom member.

10. A seat apparatus comprising a base, an upright member connected to said base, a seat back member having a lower end and being connected to said upright member for generally vertical sliding movement relative thereto between a lower position and an upper position, a selectively extendable and contractable link having a first end connected to said base and a second end connected to said seat back member, and a seat bottom member having a rearward end connected to said lower end of said seat back member for pivotal movement relative thereto about a generally horizontal axis and between a generally horizontal position and a generally vertical position.

11. A seat apparatus as set forth in claim 10 and further comprising means for limiting upward movement of said seat back member relative to said upright member beyond said upper position.

12. A seat apparatus comprising a base, a generally horizontal plate having a rearward end, and a forward end connected to said base for pivotal movement relative thereto about a generally horizontal axis and such that said rearward end is movable relative to said base between a tilted-down position and a tilted-up position, an upright member connected to said plate, a seat back member having a lower end and being connected to said upright member for generally vertical movement relative thereto between a lower position and an upper position, a selectively extendable and contractible link having a first end connected to said base and a second end connected to said seat back member, and a seat bottom member having a rearward end connected to said lower end of said seat back member for pivotal movement relative thereto about a generally horizontal axis and between a generally horizontal position and a generally vertical position.

13. A seat apparatus as set forth in claim 12 and further comprising means for biasing said plate to said tilted-down position, said biasing means including a spring extending between said base and said upright member.

14. A seat apparatus comprising a base, an upright member connected to said base, a seat back member having a lower end and being connected to said upright member for generally vertical movement relative thereto between a lower position and an upper position, a selectively extendable and contractible link having a first end connected to said base and a second end connected to said seat back member, and a seat bottom member having a rearward end connected to said lower end of said seat back member for pivotal movement relative thereto about a generally horizontal axis and between a generally horizontal position and a generally vertical position, and means for moving said seat bottom member to said horizontal position in response to movement of said seat back member to said lower position and for moving said seat bottom to said vertical position in response to movement of said seat back member to said upper position.

15. A seat apparatus as set forth in claim 14 and further comprising a generally horizontal plate having a rearward end, and a forward end connected to said base for pivotal movement relative thereto about a generally horizontal axis and such that said rearward end is movable relative to said base between a tilted-down position and a tilted-up position, wherein said upright member is fixed to said plate, and wherein said means for moving said seat bottom member includes a member having a first end pivotally connected to said plate and a second end pivotally connected to said seat bottom member.

16. A seat apparatus comprising a base, a generally horizontal plate having a rearward end, and a forward end connected to said base for pivotal movement relative thereto about a generally horizontal axis and such that said rearward end is movable relative to said base between a tilted-down position and a tilted-up position, an upright member fixed to said plate, a seat back member having a lower end and being connected to said upright member for generally vertical movement relative thereto between a lower position and an upper position, means for limiting upward movement of said seat back member relative to said upright member beyond said upper position, a selectively extendable and contractable link having a first end pivotally connected to said base and a second end pivotally connected to said seat back member, means for biasing said plate to said tilted-down position, said biasing means including a spring extending between said base and said upright member, a seat bottom member having a rearward end connected to said lower end of said seat back member for pivotal movement relative thereto about a generally horizontal axis and between a generally horizontal position and a generally vertical position, and means for moving said seat bottom member to said horizontal position in response to movement of said seat back member to said lower position and for moving said seat bottom to said vertical position in response to movement of said seat back member to said upper position.

17. An apparatus as set forth in claim 16 wherein said means for moving said seat bottom member includes a member having a first end pivotally connected to said plate and a second end pivotally connected to said seat bottom member.

* * * * *